United States Patent [19]
Redey et al.

[11] Patent Number: 5,532,078
[45] Date of Patent: Jul. 2, 1996

[54] ELECTROCHEMICAL CELL

[75] Inventors: Laszlo I. Redey; Kevin M. Myles, both of Downers Grove; Donald R. Vissers, Naperville; Jai Prakash, Downers Grove, all of Ill.

[73] Assignee: The University of Chicago, Chicago, Ill.

[21] Appl. No.: 312,053

[22] Filed: Sep. 26, 1994

Related U.S. Application Data

[63] Continuation-in-part of Ser. No. 901,547, filed as PCT/US92/08599, Apr. 8, 1994, Pat. No. 5,283,135, which is a continuation-in-part of Ser. No. 830,719, Feb. 4, 1992, Pat. No. 5,340,668, which is a continuation-in-part of Ser. No. 774,204, Oct. 10, 1991, abandoned.

[51] Int. Cl.⁶ .................................................. H01M 6/20
[52] U.S. Cl. ................................... 429/104; 429/193
[58] Field of Search .................................. 429/104, 103, 429/193, 191

[56] References Cited

U.S. PATENT DOCUMENTS

| | | |
|---|---|---|
| 4,288,506 | 9/1981 | Coetzer et al. |
| 4,546,055 | 10/1985 | Coetzer et al. |
| 4,592,969 | 6/1986 | Coetzer et al. |
| 5,057,384 | 10/1991 | Bones et al. ............... 429/104 |
| 5,230,968 | 7/1993 | Bones et al. ............... 429/104 X |
| 5,283,135 | 2/1994 | Redey et al. ............... 429/103 |
| 5,340,668 | 8/1994 | Redey et al. ............... 429/103 |

*Primary Examiner*—Anthony Skapars
*Attorney, Agent, or Firm*—Emrich & Dithmar

[57] ABSTRACT

An electrochemical cell with a positive electrode having an electrochemically active layer of at least one transition metal chloride. A negative electrode of an alkali metal and a compatible electrolyte including an alkali metal salt molten at cell operating temperature is included in the cell. The electrolyte is present at least partially as a corrugated $\beta''$ alumina tube surrounding the negative electrode interior to the positive electrode. The ratio of the volume of liquid electrolyte to the volume of the positive electrode is in the range of from about 0.1 to about 3. A plurality of stacked electrochemical cells is disclosed each having a positive electrode, a negative electrode of an alkali metal molten at cell operating temperature, and a compatible electrolyte. The electrolyte is at least partially present as a corrugated $\beta''$ alumina sheet separating the negative electrode and interior to the positive electrodes. The alkali metal is retained in a porous electrically conductive ceramic, and seals for sealing the junctures of the electrolyte and the adjacent electrodes at the peripheries thereof.

45 Claims, 3 Drawing Sheets

ELECTROCHEMICAL CELL

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This application is a continuation-in-part application of PCT application serial no. US92/08599 filed Apr. 8, 1994 as a continuation-in-part of U.S. Ser. No. 901,547, filed Jun. 19, 1992, now U.S. Pat. No. 5,283,135, which was a continuation-in-part application of Ser. No. 830,719, filed Feb. 4, 1992, now U.S. Pat. No. 5,340,668, which was a continuation-in-part application of application Ser. No. 774, 204, filed Oct. 10, 1991, abandoned.

This invention relates to an electrochemical cell and to methods of fabricating the cell and improving its capacity and/or power and capability of operating at low temperatures. The invention also relates to a new positive electrode or cathode during discharge for electrochemical cells and method of fabricating same, and more particularly, relates to electrochemical cells and positive electrodes for metal chloride batteries having lower internal impedance and greater discharge capacity with a higher specific energy and power.

According to the invention, an electrochemical cell comprises an alkali metal, and preferably, a sodium negative electrode or anode during discharge which is molten at operating temperatures of the cell, an alkali and preferably, a $Na^+$ ion conducting solid electrolyte/separator, a molten salt liquid electrolyte in the positive electrode compartment which is compatible with the positive electrode, and which is also at least partially molten at the operating temperature of the cell, and a positive electrode which is impregnated by the liquid electrolyte and which comprises, as the electrochemically active positive electrode substance of the cell, a transition metal chloride which preferably is selected from the group consisting or iron chloride, nickel chloride, chromium chloride, cobalt chloride and manganese chloride or mixtures thereof. Since the cell with a Na electrode has received the major development effort, a shorthand method of referring to these cells is ($Na/MCl_2$) battery or electrochemical cell, wherein M is one of the transition metals identified above. Batteries of this type are disclosed in U.S. Pat. No. 4,288,506 issued Sep. 8, 1981, to Coetzer et al. and U.S. Pat. No. 4,546,055 issued Oct. 8, 1985 to Coetzer et al. and U.S. Pat. No. 4,592,969 issued Jun. 3, 1986 to Coetzer et al. The batteries or electrochemical devices of the type herein discussed are useful as a power source alternative to petroleum engines and are being developed commercially, not only for electrically powered vehicles, but also for load leveling in electrical utilities.

An ideal electrochemical cell or battery should exhibit a number of characteristics, including low resistance and high discharge rates, operation over a wide temperature range, a capability to operate over a large number of cycles, and high energy on a volume, weight and cell basis. Generally, these types of electrochemical cells or batteries consist of two dissimilar metals in an ionically conductive medium, with the ionization potential of one metal sufficiently higher than the other metal to yield a voltage upon reduction/oxidation redox (coupling) over and above that needed to break down the electrolyte continuously at the positive electrode.

Metal typically goes into solution at the negative electrode or anode, releasing electrons to travel in the external circuit to the positive electrode, or cathode, doing work in transit. Material which will go through a valency drop on electrochemical discharge is included in the positive electrode. In essence, this material, the oxidizer, accepts electrons coming from the negative electrode and serves as the depolarizer. The depolarizer or cathode is positioned, in one embodiment, in the positive electrode in combination with some electrolyte-containing matrix, and should be porous to allow access of the electrolyte to the enlarged area of the depolarizer or cathode. Porosity of the cathode provides a surface at which the redox reaction may take place.

The economic and social advantages of powering automobiles from batteries are considerable as the vehicles could operate at relatively high efficiencies, such as 30–40%, and be non-polluting. Two important characteristics are considered in seeking an energy storage system for a vehicle. One of the characteristics or variables, specific power, designed in watt per kilogram (W/kg), determines to a large extent, acceleration and speed capabilities. The other consideration or variable of specific energy is designated as watt hours per kilogram (Wh/kg), determines vehicle range. The capacity density of a cell, or how much electrochemical energy the electrode will contain per unit volume is designated as ampere hours per cubic centimeter ($Ah/cm^3$).

It is generally seen, therefore, that increasing the cell capacity available during discharge and the cell power by lowering the internal impedance of the cell are both important attributes in the consideration of how and when and to what extent electrochemical cells will be placed in the vehicle as a significant portion of the vehicle propulsion systems.

Sodium/metal chloride cells of the type disclosed in the patents hereinbefore identified use a sodium anode, a β" alumina solid electrolyte and a cathode designated as $MCl_2$ with a molten electrolyte of sodium chloroaluminate, $NaAlCl_4$.

Metal halide batteries exploit the higher electrolysis threshold values of the electrolyte constituents. In charging, the positive electrode becomes poor in sodium salt with sodium metal being deposited on the negative electrode and the halogen electrochemically reacting with the metal to form a metal halide. Among halides, the fluorides and chlorides exhibit higher electrolysis thresholds than bromide and iodides, and therefore are preferred and generally used. As such, metal chloride and metal fluoride systems exhibit relatively higher energy densities and lighter mass than systems using bromides and iodides. Because of the better electrochemical properties and low price, the metal chloride systems are preferred.

As with other electrochemical cells, metal halide batteries generate electricity by transporting electrons from the fuel constituent to the oxidizer, with concomitant oxidation and reduction occurring at the negative electrode or anode and the positive electrode or cathode, respectively. The following reaction occurs:

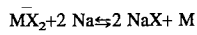

where M is a transition metal and preferably is one or more of nickel, iron, cobalt, chromium and manganese and X is a halogen, preferably chlorine. The left hand side of the above equation depicts a charged state, before reduction of the metal halide, with the right hand side of the equation depicting a discharged state with reduced transition metal.

Utilization of the metal/chloride system is usually expressed on the basis of the ratio of the reacted NaCl to the total quantity of NaCl used to fabricate the positive electrode. This practice is convenient for the Na/MCl$_2$ cell because they are fabricated in the discharge state and the MCl$_2$ active material is formed electrochemically, as noted in the above cell reaction. As used hereinafter, weight percent of a constituent in the positive electrode refers to the positive electrode in the dry state, as the electrodes exist prior to being placed in the electrochemical cell and cycled to charge the cell.

One of the significant problems in the sodium metal halide batteries is the limited battery capacity, due to the chloride of the positive electrode metal which forms a layer of low conductivity on the positive electrode. Since this metal chloride has limited conductivity, after it reaches a certain thickness on the order of one micrometer, it practically terminates further charge uptake of the cell. It has also been noted that cell capacity may be lowered after repeated charge and discharge cycles. Previous efforts to improve cell performance have involved the addition of sulfur to the liquid electrolyte or the addition of sulfide to the porous positive electrode. Neither of these solutions has been totally satisfactory.

SUMMARY OF THE INVENTION

It is an object of the present invention to provide a positive electrode and electrochemical cell including same which overcomes the limited capacity of prior cells and permits enhanced charge uptake.

Another object of the invention is to provide an electrochemical cell of the alkali/metal transition metal halide type which has increased specific energy and power output due to lower internal impedance.

One feature of the present invention is the use of bromide and/or iodide containing additives in the positive electrode compartment to increase cell capacity and power.

Another object of the invention is to use certain pore formers in the cathode in combination with the bromide and/or iodide additions as described herein providing improved electrode morphology and lower impedance resulting in lower cell operating temperatures.

Yet another object of the invention is to provide improved cell capacity and specific energy and power particularly with lower internal impedance due to the use of a bromide and/or iodide additives, pore formers in the cathode and sulfur present either in the electrolyte or in the cathode or both.

Another object of the invention is to provide a solid electrolyte having a corrugated structure resulting in greater surface area contact between the electrolyte and the electrode-active material.

In brief, the objects and advantages of the present invention are achieved by providing electrochemical cells with various combinations of additives including bromide and/or iodide and sulfur containing materials and pore formers for electrode fabrication.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

While the invention is primarily described with respect to a sodium-transition metal chloride cell, it is to be understood that the invention includes cells from other alkali metals, such as lithium and potassium, with the electrolyte being changed to correspond to the particular alkali metal.

Figure 1:
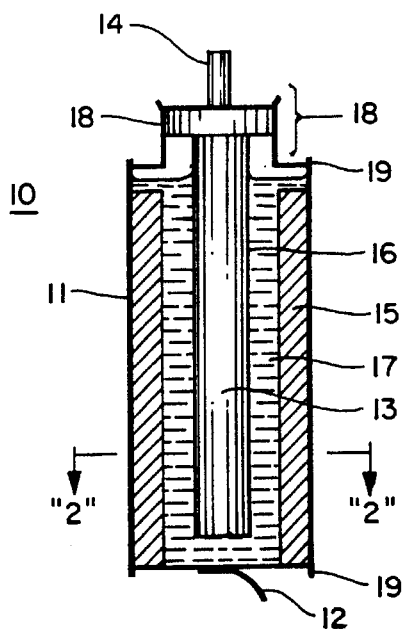
FIG. 1 is a schematic view of one embodiment of the invention in the form of an electrochemical cell.

Referring now to FIG. 1 of the drawings, there is disclosed a sodium/metal chloride cell in schematic illustration in which the cathode is exterior to the anode. A single cell 10 is illustrated, it being understood that a plurality of such cells may be connected in series, as well as in parallel, to provide the required voltage and battery capacity for any specific use such as powering an electric car, or the like. The electrochemical cell 10 includes an outer casing 11 of any suitable container which can act as a positive terminal 12, the container may be steel or any other suitable electron conducting material. Alternate metals may be nickel or nickel-coated steel, it being understood that any good electrical conductor may be used as an outer casing. A negative electrode or anode 13 includes an alkali metal, preferably sodium, molten at cell operating temperatures and in electrical contact with a negative bus 14 at the top for connection as desired. The housing 11 surrounds the positive electrode material 15 which is a combination of the chloride of the transition metal preferably Ni or Fe or Cr or Co or Mn or alloys thereof and in the partially discharged state sodium chloride and an electrolytic material, such as sodium chloroaluminate, NaAlCl$_4$. With lithium or potassium as the negative electrode, the electrolyte would be LiAlCl$_4$ or KAlCl$_4$, respectively.

Figure 2:
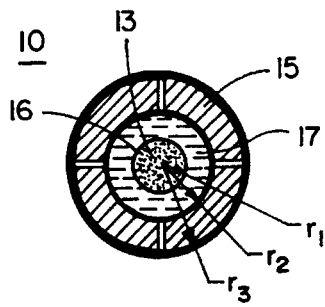
FIG. 2 is a sectional view of the electrochemical cell of FIG. 1 as seen along lines 2—2 thereof.

For illustrative purposes, the positive electrode may contain nickel, nickel chloride, sodium chloride and sodium chloroaluminate which is also liquid at cell operating temperatures which are generally in the range of from about 200° C. to about 400° C., but normally prior art cells operate in the range of from about 250° C. to about 335° C. A β" alumina electrolyte solid tube 16 is positioned to contain the anode 13 and separate the anode 13 from the positive electrode material 15 consisting of the chloride of the transition metal, such as NiCl$_2$ along with the sodium chloroaluminate. Inwardly of the β" alumina electrolyte 16 is liquid electrolyte 17 which may contain solid chloride salt of the anode material to increase cell capacity. Finally, the cell 10 is closed by an alumina header 18 in the form of a disc as by weld 19. FIG. 2 is a cross-sectional view of the cell of FIG. 1 and shows the relationship of the cathode segments 15, the liquid electrolyte 17, the β" alumina tube 16 and the anode 13. The segments of the cathode can be fabricated by using wedge shaped pieces to form support for the cathode segments during sintering, where the supports are complimentary in shape to the cathode segments. The cell reactions for a positive electrode of $NiCl_2$ or $FeCl_2$ as hereinbefore stated are:

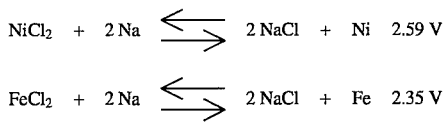

As hereinbefore stated, the positive electrode may be of a variety of materials or transition metals, specifically the materials may include iron, nickel, cobalt, chromium, manganese, or alloys thereof. While one transition metal is normally used for the positive electrode, combinations may have some advantages. As an illustration, iron powder may be used with a nickel rod as a current collector with $FeCl_2$ as the metal chloride in the molten electrolyte. For purposes of example only, and without limiting the scope of the invention, the nickel/nickel chloride positive electrode will be described. In all cases, the negative electrode or anode was sodium metal, liquid at cell operating temperatures. In addition, sodium chloroaluminate was used with the β" alumina as the electrolyte material 17. To provide enough capacity and form sufficient quantity of nickel chloride, sodium chloride must be added to the positive electrode during fabrication. Additional sodium chloride solid can be added to the liquid electrolyte 17 to provide additional capacity to the cell 10. For instance, it has been found that the addition of 0.3 g NaCl/gNi solid NaCl in the liquid electrolyte is advantageous. Up to 0.66 g NaCl/gNi ratio in the porous electrode and high surface area of the nickel particles are required to achieve about 33% electrochemical utilization of nickel. With the addition of solid sodium chloride in the liquid electrolyte, up to 50% electrochemical utilization of nickel is possible. For cells with lithium or potassium electrodes, the salt would be LiCl or KCl.

Also, as hereinbefore stated, the nickel/nickel chloride positive electrode has a capacity and specific power which is limited by the nickel chloride layer formation on the surface of the nickel particles, which nickel chloride layer forms when the cell is charged. After the nickel chloride reaches a thickness on the order of about one micrometer, further charge uptake is terminated. This inherent limitation has been overcome by use of the following additives, which was the subject matter of U.S. Pat. No. 5,283,135 issued Feb. 1, 1994 of which this application is a continuation-in-part.

In general, the additives found beneficial contained bromide, iodide, sulfur, and various pore formers. More specifically, it was found that bromide could be present in the range of 1 to 25 wt % expressed on the basis of the weight of the positive electrode and as equivalent to NaBr on the basis of halogenoid content, and/or iodide could be present in the range of 0.05 to 25 wt % expressed on the basis of the weight of the positive electrode and as equivalent to NaI on the basis of the halogenoid content. The preferred amounts of NaBr and NaI or their equivalents on halogenoid basis used were 5–10% and 5–12% by weight, respectively, but the total amount of halide additives should not exceed about 30% by weight. It is to be understood that other sources of the bromide and iodide may be used, such as $AlBr_3$, $AlI_3$, $NiBr_2$ and $PbI_2$, with the preferred amounts being in the above ranges based on the sodium salts.

Sulfur can be added to the positive electrode as elemental sulfur or sulfide, such as $Na_2S$; the useful range for sulfur is 0.05 to 10 wt % with about 2% by weight being preferred. Where various combinations of halide and sulfur are used as additives, preferably the combination should not exceed about 30% by weight.

The pore former may be any material which decomposes to gases during fabrication. The preferred pore formers are the ammonium salts of carbonic acid or other weak organic acids, such as formic, acetic or oxalic or these weak organic acids themselves since these do no cause undesirable reactions with the materials of the cell. Other materials such as oxamide or methylcellulose may also be used as pore formers, but the preferred pore former is $(NH_4)_2CO_3$. The pore former may be present in the range of from about 5% to about 20% by weight, the preferred range being about 5% to about 15% and the best results being about 10% by weight.

It is believed that the superior results reported herein are due, in part, to the modification of the chloride coating and to the controlled pore distribution during positive electrode fabrication, thereby increasing cell performance. This increased performance is primarily evidence in capacity and/or power which may occur by a result of decreased impedance or by increasing the amount of active electrode material during the charge cycles. While the other alkali and transition metals may be used for cells of the invention, the results are particularly favorable for the $Na/NiCl_2$ cell.

Where nickel felt or foam was used instead of nickel powder, the felt could be used alone or additional nickel powder sintered to the felt could be used. The pore former was always used with a sintered nickel electrode, and weight percents for the pore former relate to the amount of the pore former before sintering.

In the examples as described below, positive electrodes were fabricated as described for each example and installed in a cell as illustrated in FIG. 1 of the before-mentioned U.S. Pat. No. 5,283,135, the disclosure of which is incorporated by reference with a sodium negative electrode, solid electrolyte, and a NaCl and $NaAlCl_4$ electrolyte which is molten at the operating temperature of 300° C. A voltage of up to 3.1 V was applied to charge the cell with the capacity, power and/or impedance measured. Performance during discharge was also measured. Repeated cycles of charge, and discharge were carried out.

EXAMPLE 1

7 Wt % NaBr+10 wt % Pore Former

This examples illustrates the typical fabrication of $Ni/NiCl_2$ electrode. The weight of the materials are relative to the dry electrode weight 4.3 g nickel powder (0.68 M²/g BET area, 0.55 g/cm³ bulk density, 1.74 g sodium chloride powder with mesh size—270+325, 0.605 g sodium chloride with mesh size −325+400, and 0.500 g sodium bromide (325+400 mesh size) were mixed together thoroughly. To this mixture of the salts a 0.7145 g of the pore former, ammonium bicarbonate was added and thoroughly mixed.

The mixture was then placed in a stainless steel die and pressed to obtain an electrode with 2.85 cm diameter and 0.5 cm thickness. This electrode as described above was then placed in a tube furnace and heated first at 250° C. for 30 minutes under a hydrogen containing atmosphere (5% hydrogen+ 95% helium) in order to remove pore former as ammonia, water, and carbon dioxide gases and finally to 700° C. for one hour for sintering. The electrode was removed from the furnace and placed in the cell in the positive electrode compartment. The cell was charged and discharged with the discharge performance being measured and reported in the '135 patent, and resulted in improved performance compared to cells without additives and pore formers.

EXAMPLE 2

7 Wt % NaBr+1 Wt % Vapor—Phase Sulfidation

The positive electrode was fabricated by the same procedure as described in Example 1. The amounts of the chemical used was also exactly as in Example 1, except that no pore former was used for this electrode and, therefore, the electrode was not heated at 250° C. Rather, the electrode was heated directly at 700° C. for one hour. After removing the electrode from the furnace it was sulfidized to 1.0 weight percent by sulfur vapor. The performance of this cell system reveals an improvement in performance provided by the addition of the bromide addition and the 1 wt % sulfur.

EXAMPLE 3

7 Wt % NaBr+10 Wt % Pore Former+0.5 Wt % Vapor Phase Sulfidation

NaBr (0.5 g) and pore former (1.45 g) were introduced in the electrode as described above for Example 1 and the electrode was sintered and then sulfidized by 0.035 g of sulfur. Tests on the cell demonstrated that this combination produced better capacity, cycle life and lower impedance than the combination described in Example 2.

EXAMPLE 4

7 Wt % NaBr+2 Wt % S in Electrolyte

NaBr (0.5 g) was introduced in the electrode as described and 2 wt % sulfur by the electrode weight (7.145 G) was incorporated to the liquid $NaAlCl_4$ electrolyte. This combination produced lower cell impedance and higher capacity than the cell in Example 3. These results demonstrated that the addition of sulfur to the electrolyte also resulted in an improvement in cell performance.

EXAMPLE 5

7 Wt % NaBr+10 Wt % Pore Former+ 2 Wt % S in the Electrolyte

The positive electrode was fabricated in accordance with the procedure described in Example 1. A 2 wt % sulfur by the electrode weight (7.145 g) was mixed very thoroughly to the liquid $NaAlCl_4$ electrolyte by slowly and carefully increasing the temperature to 200° C. After mixing the sulfur with the $NaAlCl_4$ electrolyte, the positive electrode was placed in the positive electrode assembly of a $Na/NiCl_2$ cell, which delivered improved performance provided by the combination of the bromide addition, the pore former and sulfur.

EXAMPLE 6

0.5 Wt % NaI+10 Wt % Pore Former+ 2 Wt % Sulfur

Pore former was introduced in the electrode during electrode fabrication. NaI (0.035 g) and sulfur (0.1429 g) were added to the electrode or electrolyte. The combination produced better cell capacity and impedance than the cell in Example 5. More specifically, the small addition of the iodide was very effective compared to the bromide addition of Example 5.

EXAMPLE 7

7 Wt % NaBr+2 Wt % NaI+10 Wt % Pore Former

This combination was incorporated in the nickel chloride electrode during fabrication. The incorporation was achieved with or without the pore former, but the inclusion of pore former produced better results.

EXAMPLE 8

7 Wt % NaBr+10 Wt % Pore Former+ 5 Wt % NaI in the Electrolyte

The positive electrode was fabricated in accordance with the procedure described in Example 1 except lower sintering temperature of 550°–650° C. was used. The amounts of the chemical used was exactly the same as in Example 1. Before placing the electrode in the positive electrode assembly, sodium iodide (0.3573 g) was added to the electrolyte. After this step, the positive electrode was placed in the cell assembly.

EXAMPLE 9

7 Wt % NaBr+10 Wt % NaI+10 Wt % Pore Former+5 Wt % Sulfur

The positive electrode $Ni/NiCl_2$ was fabricated in accordance with the procedure described in Example 8. Before placing the electrode in cell assembly, a 5 wt % sulfur (0.3572 g) and 10 wt % sodium iodide (0.7145 g) by the electrode weight (7.145 g) were added to the $NaAlCl_4$ electrolyte. The electrode was then placed in the positive electrode compartment of $Na/NiCl_2$ cell. The performance of this cell system showed an improvement provided by the combination of additive plus the pore former.

EXAMPLE 10

10 Wt % NaI+20 Wt % Pore Former 1.36 g Ni (15 vol %), 0.552 g NaCl (−270+ 325 mesh size), 0.259 g NaCl (−325 mesh size), and 0.231 g NaI (−325 mesh) were mixed together thoroughly. To this mixture of the salts a 0.4804 g of the pore former ammonium bicarbonate was added and thoroughly mixed. The mixture was then placed in a stainless steel die and pressed to obtain an electrode with 1.15 cm diameter and 1.0 cm long. This electrode, as described above, was then placed in a tube furnace and heated first at 250° for 30 minutes, under a hydrogen-containing atmosphere (5% hydrogen+ 95% helium) in order to remove pore former as ammonia, water, and carbon dioxide gases and, finally, to 600° C. for one hour for sintering. The electrode was removed from the furnace and placed in a cell having the positive electrode within the β"- alumina tube and sodium negative electrode outside the tube. A 2 wt % NaI (0.048 g) relative to the dry electrode weight was added to the liquid NaAlCl$_4$ electrolyte. The cell was charged and discharged and the performance of the cell recorded.

EXAMPLE 11

1 Wt % NaI+ 20 Wt % Pore Former

The positive electrode was fabricated by the same procedure as described above in Example 10. In this example, however, 1 wt % NaI was used. The electrode was sintered in the same way as described in the example. The performance of this electrode was lower than the electrode described in Example 10. The data showed that the electrode of Example 9 which includes 10 wt % sodium bromide, 2 wt % sodium iodide, 3 wt % sulfur with the use of the ammonium bicarbonate pore former in the amount of about 10% by weight of the dry positive electrode provided the best results for the tests. In all cases, percentages of additives expressed as weight percentages of the positive electrode relates to the weight of the positive electrode in the dry state, that is before being soaked with the electrolyte and changed through cycling. The data further showed that the capacity is much improved using the cell of the invention compared to an electrochemical cell without additives whatsoever.

The data also showed that a cell made according to the present invention can be charged up to 200 mWh/cm$^2$ in about one half hour and to 600 mWh/cm$^2$ in about 3 hours can be charged, representing almost 90% of the final charge attainable even after 12 hours of charging time. This is a significant advantage over the prior art presently known wherein charging times for the prior art automobile batteries are in the neighborhood of 8–15 hours. Recharging a battery for an electric car in half an hour as opposed to 8 hours is an extraordinary improvement.

The data also showed that a battery with a positive electrode made according to Example 9 can operate at 150° C. compared to the usual 250° C.–335° operating temperatures for batteries presently being used. The advantage of low operating temperatures and the batteries in the environment are significant. By operating the battery at lower temperatures reduces the heat management problems inherent with any battery of this type. Operating at temperatures of 335° C. increases the solubility of the nickel chloride present in the battery and when nickel ions exchange for sodium ions in the electrolyte, the internal impedance of the battery rises and hence, the heat given off during discharge rises. Moreover, lowering the operating temperature of the battery increases the battery life by reducing the glass seal corrosion. Glass seals are usually used in these batteries between the ceramic components of the cell. Thus, lowering the operation temperature slows the corrosion reaction, thereby extending the life of the battery.

There is a difference in morphology for electrodes made in accordance with Example 9 characterized as ANL 92 and an electrode without the pore formers or halide additives which is designated ANL 90. The high surface area of about 10.3 m$^2$/cm$^3$ of the Example 9 electrode (ANL 92) includes the existence of micro pores in the range of between about 0.005 and 0.5 micrometers as well as macro pores in the range of from about 1 to about 80 micrometers. The simultaneous presence of both micro pores and macro pores, referred to as bimodal pore distribution, results in an improved morphology of the nickel chloride electrode resulting in a high BET area. The macro pores in the nickel matrix do not get blocked by the formation of sodium chloride crystals during the discharge reaction which gives easy access of the active material to the electrode which would have been blocked if the macro pores were not there. The existence of the micro pores increases the high surface area of the electrode which apparently results when combined with the macro pores in increased specific capacity and volumetric capacity as illustrated in TABLE I.

TABLE 1

NICKEL CHLORIDE ELECTRODE CAPACITY CHARACTERISTICS FOR VARIOUS NICKEL SUBSTRATES

| Nickel Electrode | BET Area CM$^2$/G | Area Capacity MAh/cm$^2$ | Specific Capacity mAh/g | Volumetric Capacity mAh/cm$^3$ |
| --- | --- | --- | --- | --- |
| Nonporous wire | –3.8 | $-1.7 \times 10^{-1}$ | $-6.3 \times 10_{-1}$ | |
| Felt | $3 \times 10^3$ | $1.8 \times 10^{-1}$ | 56 | 30 |
| ANL-90 (Sintered) | $1.8 \times 10^4$ | $7.0 \times 10^{-3}$ | 142 | 200 |
| ANL-92 | $7.7 \times 10^4$ | $6.0 \times 10_{-3}$ | 399 | 551 |

TABLE I shows that the ANL 92 (Example 9) electrode is approximately 250% better in both specific capacity and volumetric capacity than is the prior ANL 90 electrode without the pore former and halide additives. Because the volumetric capacity determines the available miles a car can operate before charging and is related to the power output of the battery, it is volumetric capacity which is the most telling statistic when judging performance of electric automobile batteries.

Another feature of the invention is that batteries presently available for electric car use have an initial power in the neighborhood of 100 watts per kilogram (W/kg) but by the end of the discharge cycle, the presently available batteries are usually operating at about 60 W/kg. The battery of Example 9 has an initial power of about 200 W/kg and a final power, that is at the end of discharge, of about 170 W/kg demonstrating not only the 100% increase in battery initial power but just as important almost a 300% increase in power at the end of the discharge cycle. This feature provides a significant advantage for electric car operation because the battery power at the end of the discharge cycle is within about 15% of initial power, a substantial improvement over batteries which are presently available.

Accordingly, it is seen with the battery of the present invention, specific capacity, volumetric capacity and specific power are all greatly increased with respect to the best known prior art batteries of this type.

It is also known that the thickness of the electrode has an effect on cell operation and varying the thickness of the electrode, will vary the impedance within the cell; however, it is believed that the addition of the additives described herein, these being bromide, iodide and sulfur containing materials and use of a suitable pore former enhances the discharge capacity of the cell and lowers the impedance.

Although the cell voltage of the $Na/FeCl_2$ cell (2.32 V) is somewhat lower than its counterpart $Na/NiCl_2$ (2.58 V), the $Na/FeCl_2$ cell system does offer some unique advantages. One of the major advantages of the $Na/FeCl_2$ battery system is that the iron chloride positive electrode can utilize scrap iron, table salt, and recycled aluminum cans as the materials of fabrication that will reduce the cost of the commercial full size battery by a significant amount. The use of these materials may also help the environment in a variety of ways. The performance of the present batteries, however, is severely limited due to the problem of overcharging of the cells, which results in the oxidation of iron (II) to iron (III) chloride in the positive electrode. The Fe(III) thus formed is exchanged with the sodium ions of the $\beta''$-alumina electrolyte. The exchange of the $Na^+$ by $Fe^{3+}$ causes the impedance of the $\beta''$-alumina and thus the cell to rise by a significant amount. Ion exchange also severely damages the integrity of the $\beta''$-alumina. Due to these effects the power, and thus the life of the $Na/FeCl_2$ cell declines rapidly with cycling to unacceptable values.

It was unexpectedly discovered that overcharge protection of the iron chloride was obtained by modifying the chemistry of the iron chloride electrode by the use of the chemical additives such as NaI and S, which suppress the oxidation of $FeCl_2$ to $FeCl_3$ and hence improve the cell performance. In addition to the overcharge protection, these additives significantly enhanced the capacity and power performance of the iron chloride electrode due to the modification of the electrode chemistry during the charge and discharge of the cell. The electrode fabricated with these additives has shown excellent overcharge protection, energy, power, and cycle life. This new chemistry would save nickel for the cell component fabrication. In our experiments we observed that even at the high charge voltage of 2.9 V vs. Na, there were no indications of $FeCl_3$ formation. At this charge voltage a cell without the additives would disintegrate. The suppression of $FeCl_3$ formation during the charge reaction is due to the preferred electrochemical oxidation of NaI to $I_2$ at the potentials where Fe(II) otherwise would oxidize to Fe(III) hence suppressing the formation of Fe(III). Iodine thus formed reacts with iron metal to form Fe(II). In addition, a redox reaction (2 NaI+2 $FeCl_3 \rightarrow$ 2 $FeCl_2+I_2+$ 2 NaCl) probably also takes place very rapidly to convert any $FeCl_3$, if formed, to give $FeCl_2$. The details of the incorporation of these chemical additives in the $FeCl_2$ electrode are provided in the following examples.

EXAMPLE 12

2 Wt % S+10 Wt % Pore Former+10 Wt % NaI

This example illustrates the typical fabrication of $Fe/FeCl_2$ electrode with additives to provide overcharge protection. The weight of the materials are relative to the dry electrode weight 3.87 g iron powder, 1.73 g NaCl powder with mesh size −270+325, and 0.905 g sodium chloride with mesh size −325+400 were mixed together thoroughly. To this mixture of the salts, 0.65 g of the pore former (ammonium bicarbonate) was added and thoroughly mixed. The mixture was then placed in a stainless steel die and pressed to obtain an electrode with a 2.85 cm diameter and an 0.5 cm thickness. This electrode was then placed in a tube furnace and heated first at 250° C. for 30 minutes under a hydrogen containing atmosphere (5% hydrogen+ 95% helium) in order to remove pore former as ammonia, water, and carbon dioxide gases and finally to 700° C. for one hour for sintering. Before placing the electrode in the cell assembly, 2 wt % sulfur (0.13 g) and 10 wt % sodium iodide (0.65 g) were added to the $NaAlkCl_4$ electrolyte. The electrode along with this electrolyte mixture was then placed in the positive electrode compartment of the cell.

EXAMPLE 13

5 Wt % S+10 Wt % Pore Former+ 10 Wt % NaBr+10 Wt % NaI

The combination of 10 wt % pore former, 10 wt % NaBr, and 5 wt % NaI was introduced in the electrode during electrode fabrication as described in Example 12. The remaining 5 wt % NaI and 5 wt % S were mixed thoroughly with the liquid electrolyte by slowly and carefully increasing the temperature to 200° C. After mixing the sulfur and NaI with the $NaAlCl_4$ electrolyte, the positive electrode was placed in the positive electrode assembly of a $Na/FeCl_2$ cell.

Both the electrodes of Examples 12 and 13 were repeatedly cycled without the expected disintegration due to Fe(III) formation, and upon examination no Fe(III) was detected.

Referring to FIGS. 1 and 2, the electrochemical cell 10 there disclosed has the cathode exterior to the anode. One of the benefits of this construction referred to in this application is that more power can be generated. Another aspect of this construction, only recently discovered, is that the $\beta''$ alumina electrolyte tube 16 can be fabricated in a corrugated shape thereby providing increased surface area of the $\beta''$ alumina tube. This is important because the transfer of ions with the solid electrolyte tube 16 is a surface area phenomena.

Figure 3:
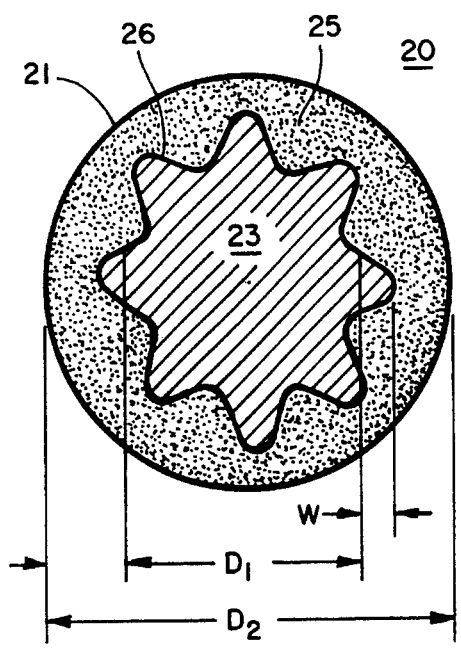
FIG. 3 is a view like FIG. 2 for another embodiment of the electrochemical cell.
Figure 4:
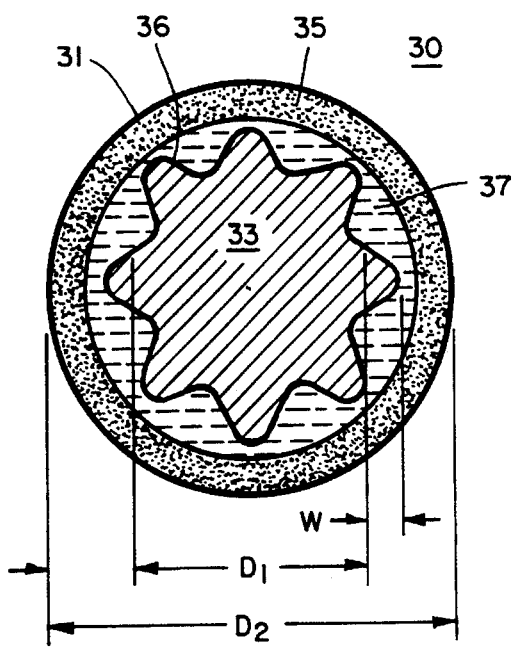
FIG. 4 is a view like FIG. 2 for another embodiment of the electrochemical cell.
Figure 5:
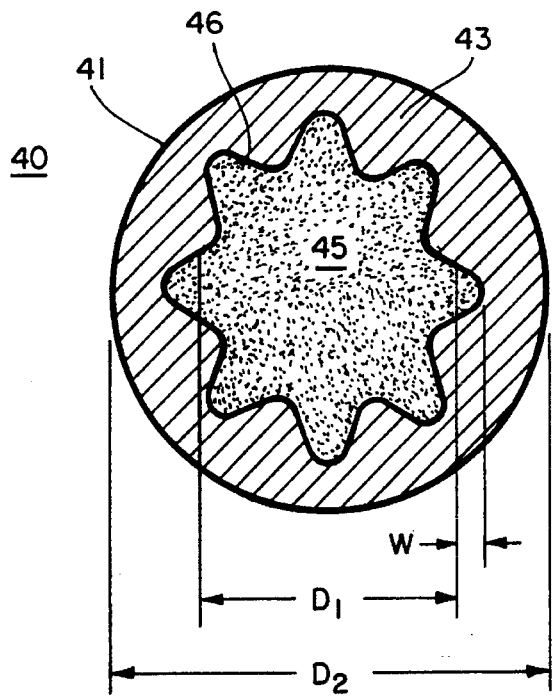
FIG. 5 is a view like FIG. 2 for another embodiment of the electrochemical cell.

FIGS. 3–5 show different configurations for an electrochemical cell having a $\beta''$ alumina electrolyte. In all cases a view like FIG. 2 is used as representative of the cell, it being understood that the terminals, headers, seals and the like shown in FIG. 1 would be replicated in a similar device for each of FIGS. 3–5.

FIG. 3 particularly shows an electrochemical cell 20 in which a casing 21 tubular in transverse cross section houses a sodium anode 23 interior of a corrugated $\beta''$ alumina electrolyte 26. Between the housing 21 and the $\beta''$ alumina 26 is the cathode 25 which may be sintered and porous to provide a bimodal cathode 25 having the iodine, bromine and sulfur additives hereinbefore described. A significant advantage to the construction of cell 20 is that various geometries are available without altering the $\beta''$ alumina tube 26 and header 18 which is by virtue of the materials difficult to fabricate and expensive. By designing a cell 20 with the exterior cathode 25, a variety of different sizes and shapes exterior to the $\beta''$ alumina electrolyte 26 may be configured all without changing the geometry of the alumina tube 26 and header 18. As illustrated, the casing 21 may be nickel if the positive electrode is nickel chloride and may be iron or an alloy thereof if the cathode material 25 is iron chloride. An advantage of this construction is that should the $\beta''$ alumina tube 36 develop cracks, the presence of an electrolyte consisting of sodium aluminum chloride, when contacted by the liquid sodium anode precipitates aluminum from the electrolyte and seals minute cracks which develop in the $\beta''$ alumina tube. By way of example, the amplitude of the corrugation of the $\beta''$ alumina tube 26 preferably are in the range of from about 0.05 to about 0.2 cms whereas the wavelength of the corrugations preferably is in the range of from about 0.2 to about 0.6 cms.

A construction of a corrugated tube 26 will provide a β" alumina tube with a surface area greater than 1.5 times that of a smooth cylindrical tube and perhaps as much as 1.7 times.

FIG. 4 is a view like FIG. 3 of a cell 30 having a casing or housing 31 which may be nickel, iron or the like. A corrugated β" alumina tube 36 houses sodium electrode 33 with the sintered porous bimodal cathode 35 being positioned adjacent the casing or housing 31. A electrolyte liquid 37 which may be sodium aluminum chloride is provided intermediate the porous cathode 35 and the β" alumina tube 36. In order to provide additional capacity, solid sodium chloride may be present in the liquid electrolyte 37 and has been found to provide surprisingly good results in increasing the capacity of the cells 30.

FIG. 5 shows a cell 40 having a nickel casing 41 with the nickel chloride cathode 45 being positioned inside the corrugated β" alumina tube 46 and interior to the sodium anode 43. The cell of FIG. 5 is similar in configuration to that illustrated in the parent '135 patent with the exception of the corrugated β" alumina tube 26.

Figure 6:
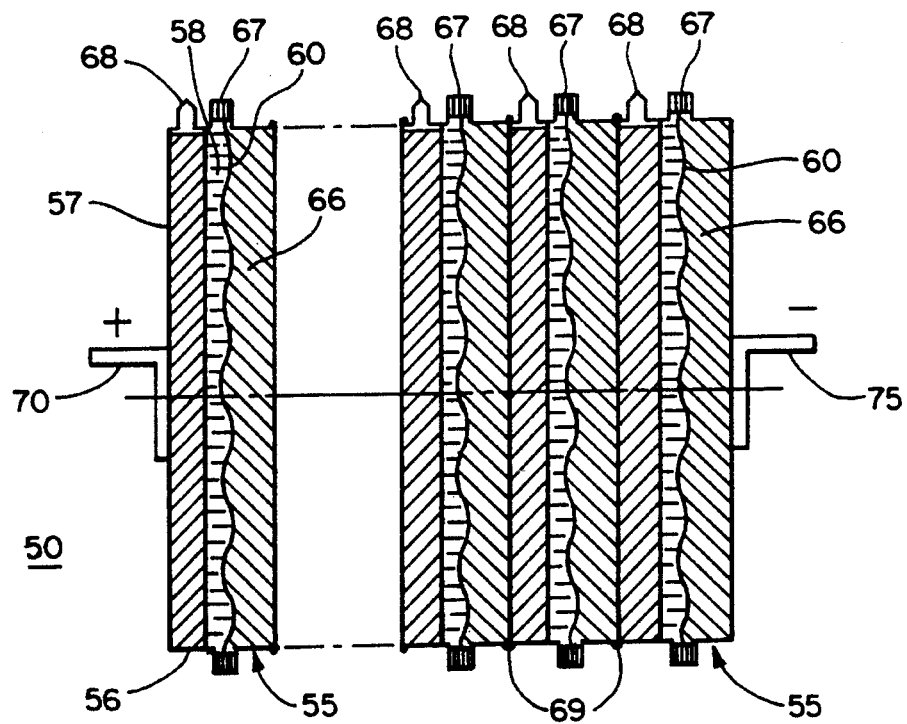
FIG. 6 is a schematic view of a bipolar battery of electrochemical cell showing a corrugated β" electrolyte.

FIG. 6 shows a bipolar battery 50 comprised of a plurality of individual cells each being relatively thin and having cathode materials 56 positioned in a casing 57, the cathode material being nickel, nickel chloride or other transition metals or alloys thereof previously discussed. Adjacent the cathode 56 is a liquid electrolyte 58 which may contain solid salt particles such as sodium chloride if the anode is sodium, as will be described. Trapping the liquid electrolyte 58 against the cathode 56 is the corrugated β" alumina electrolyte 60. Again, the construction of these batteries 50 is in the form of thin disc like laminated sandwiches and the materials are those previously described.

Finally, the anode 66 is on the other side of the β" alumina barrier 60 from the cathode 56 so that each cell 55 in the battery 50 is comprised of the transition metal chloride bimodal cathode with the additives herein before disclosed, a liquid metal anode of an alkali such as sodium, a β" electrolyte which is solid and a liquid electrolyte portion which may be sodium aluminum chloride with solid sodium chloride therein to add capacity to the battery. As illustrated in FIG. 6, each of the cells 55 requires sealing mechanism 67 which serves to seal the anode 65 with the solid electrolyte 60 and the liquid electrolyte 58. There is also provided a sealing mechanism 68 which is used to load the electroactive cathode material into the cathode 56. A stack of such cells 55 is used to provide the battery 50 with a positive terminal 70 and at one thereof connected to a cathode and a negative terminal 75 and the other end thereof connected to an anode, all as well understood in the art.

In the construction illustrated, because the individual cells 55 are very thin, for instance, the β" alumina 60 may only have a thickness in the range of 0.01 to about 0.05 cms and the positive electrode or cathode may only have a thickness in the range of from 0.2 to 0.8 cms, the β" electrolyte 60 is provided with a porous ceramic support structure 65 in which the liquid alkali metal is located. Such a structure may be titanium diboride or zirconium diboride to name only two ceramics which are suitable materials for a construction of the type herein set forth.

In sodium/metal chloride cells, the ratio of the volume of liquid electrolyte 58 to the volume of the cathode 56 is preferably in the range of about 0.1 to about 3 and preferably about 0.5–1. The battery 50 herein described is comprised of a plurality of what is known as bipolar cells 55. Each of which as illustrated is provided with welds 69 between the adjacent cathodes and anodes.

Figure 7:
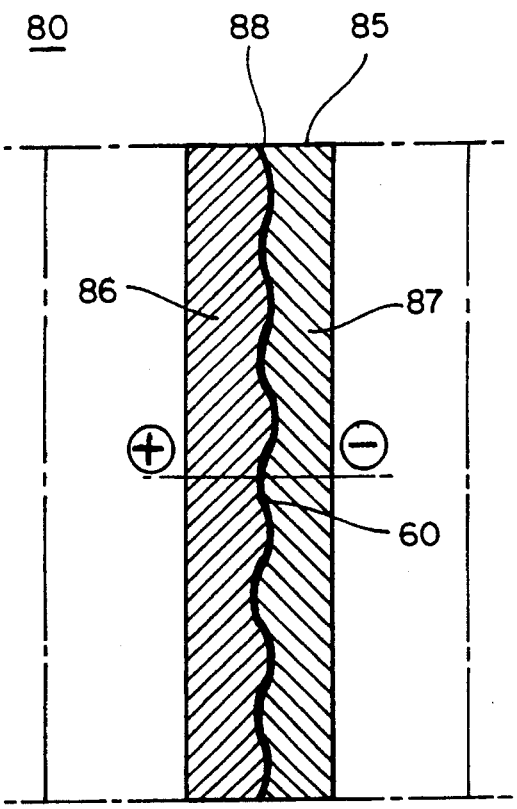
FIG. 7 is a view like FIG. 6 showing another embodiment of the bipolar cell.

Referring now to FIG. 7, there is disclosed a battery 80 made up of cells 85, which are similar in construction to the cells 55 with the exception the liquid electrolyte is restricted only to the pores of the electrode 86. Each of the cells 85 is provided with a positive electrode 86 which is porous and preferably bimodal with the additives hereinbefore discussed and is separated from a porous anode 87 by a β" alumina electrolyte 88. The materials previously described useful for making up the battery 50 are also useful in making up the battery 80 along with various sealing materials, welds and means for introducing cathode material as required.

Figure 8:
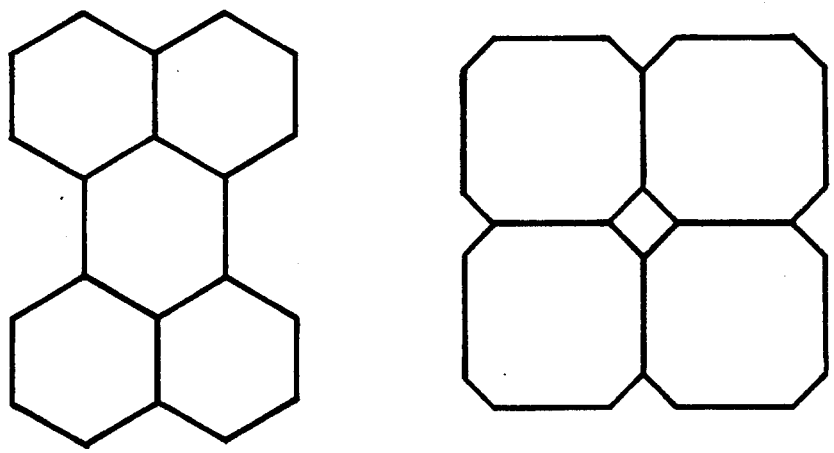
FIG. 8 is a cross sectional view of the representative cell containers illustrating various geometries available with the inventive cells.

Referring to FIG. 8, there are shown two different polygon arrangements for cells which are formed into batteries incorporating the features of the present invention. In the left hand portion of FIG. 8, there is illustrated a series of hexagon shaped cells which may be made with an exterior cathode of the type illustrated in FIGS. 1–4 inclusive. Polygon shapes illustrated in FIG. 8 lend themselves to a variety of uses and advantages for instance the shape illustrated in the right hand portion of FIG. 8 is convenient because it permits designing a temperature control port which is centrally located for contiguous cells useful for heat exchange gas or liquid medium necessary to control the temperature of the cells. In the hexagon shaped configuration of the left-hand side of FIG. 8, insulative layers of materials such as glass mats are used to prevent shorting of adjacent cells but provide a close packing not easily obtained in cells with tubular configurations. The exterior cathode of the present invention in combination with the corrugated solid electrolyte provides significant advantages and design flexibility, specific power and other factors important to the electrical automobile which is a major environmental concern in the coming century.

While there has been disclosed what is considered to be the preferred embodiment of the present invention, it is understood that various changes in the details may be made without departing from the spirit, or sacrificing any of the advantages of the present invention.

The embodiments of this invention in which an exclusive property or privilege is claimed are defined as follows:

1. An electrochemical cell comprising a positive electrode, a negative electrode of an alkali metal and a compatible electrolyte including an alkali metal salt molten at cell operating temperature, said electrolyte being at least partially present as a corrugated β" alumina tube in sealing contact with an α-alumina header.

2. The electrochemical cell of claim 1, wherein the positive electrode has an electrochemically active layer of at least one transition metal chloride, wherein the transition metal is one or more of Ni, Cr, Co, Mn, Fe or alloys thereof.

3. The electrochemical cell of claim 1, wherein the amplitude of the corrugations is in the range of from about 0.05 to about 0.2 cm and the wavelength of the corrugation is in the range of from about 0.5 to about 1.0 cm, thereby to provide between 1.5 to 1.7 the surface are of a right circular tube.

4. The electrochemical cell of claim 1, wherein the corrugated β" alumina tube has a thickness in the range of from about 0.01 to less than about 0.05 cm.

5. The electrochemical cell of claim 4, wherein a porous support structure is provided for the β" alumina tube.

6. The electrochemical cell of claim 5, wherein the porous support is $TiB_2$ or $ZrB_2$.

7. The electrochemical cell of claim 2, wherein the corrugations have an amplitude in the range of from about 0.05 to about 0.2 cm and a wave length in the range of from about 0.5 to abut 1 cm, the positive electrode is bimodal and has a thickness in the range of from about 0.2 to about 0.8 cm.

8. The electrochemical cell of claim 7, and further including bromide and/or iodide and sulfur containing additives in said positive electrode or said electrolyte.

9. The electrochemical cell of claim 8, wherein a pore former is present in the positive electrode prior to formation thereof in the range of from 5–30 wt %.

10. The electrochemical cell of claim 9, wherein the pore former is present in an amount not to exceed about 20 wt % and is an ammonium salt.

11. The electrochemical cell of claim 10, wherein the transition metal chloride layer contains said additives.

12. The electrochemical cell of claim 10, wherein the electrolyte contains said additives for incorporation into said chloride layer during charging of the cell.

13. The electrochemical cell of claim 9, wherein the amount of the bromide and/or iodide containing additive is in the range of about 1–25 wt % and about 0.05–25 wt %, respectively, based on the weight of the positive electrode and equated to NaBr and NaI, the total of the weights being in the range of about 1–30 wt %.

14. The electrochemical cell of claim 13, wherein the sulfur containing additive is present in the range of about 0.05–10 wt % based on the weight of the positive electrode with the total of the bromide and sulfur additives being in the range of about 1–25 wt %, the total of the iodide and sulfur additives being in the range of about 0.10–25 wt % and the total of the bromide, iodide and sulfur additives being in the range of about 1–30 wt %.

15. The electrochemical cell of claim 13, wherein the alkali metal is sodium, the alkali metal salt is sodium chloride, and the bromide and iodide containing additives are bromide and iodide chlorides.

16. The electrochemical cell of claim 15, wherein the transition metal is nickel or iron or mixtures or alloys thereof.

17. An electrochemical cell comprising a positive electrode having an electrochemically active layer of at least one transition metal chloride, a negative electrode of an alkali metal and a compatible electrolyte including an alkali metal salt molten at cell operating temperature, said electrolyte being present at least partially as a corrugated $\beta''$ alumina tube having a thickness of less than 0.05 cm surrounding said negative electrode interior to said positive electrode.

18. The electrochemical cell of claim 17, wherein a pore former is present in the positive electrode prior to formation thereof in the range of from 5–30 wt %.

19. The electrochemical cell of claim 18, wherein the pore former is present in an amount not to exceed about 20 wt % and is an ammonium salt, the amplitude of the corrugations is in the range of from about 0.05 to about 0.2 cm, and the wavelength of the corrugations is in the range of from about 0.2 to about 0.6 cm and said corrugated $\beta''$ alumina tube has a thickness of about 0.01 cm.

20. The electrochemical cell of claim 18, and further comprising bromide and/or iodide and sulfur containing additives in said positive electrode or in said electrolyte, wherein the amount of the bromide and/or iodide containing additive is in the range of about 1–25 wt % and about 0.05–25 wt %, respectively, based on the weight of the positive electrode and equated to NaBr and NaI, the total of the weights being in the range of about 1–30 wt %, and the transition metal is Ni.

21. The electrochemical cell of claim 20, wherein the sulfur containing additive is present in the range of about 0.05–10 wt % based on the weight of the positive electrode with the total of the bromide and sulfur additives being in the range of about 1–25 wt %, the total of the iodide and sulfur additives being in the range of about 0.10–25 wt % and the total of the bromide, iodide and sulfur additives being in the range of about 1–30 wt %, the alkali metal is sodium, the alkali metal salt is sodium chloride, and the bromide and iodide containing additives are bromide and iodide chlorides.

22. The electrochemical cell of claim 21, wherein the transition metal chloride layer contains said additives.

23. The electrochemical cell of claim 21, wherein the electrolyte contains said additives for incorporation into said chloride layer during charging of the cell.

24. The electrochemical cell of claim 20, wherein said positive electrode is electrically connected to the cell housing, said housing forming a polygon in transverse cross section.

25. The electrochemical cell of claim 24, wherein said polygon is a hexagon.

26. The electrochemical cell of claim 24, wherein said polygon is a square.

27. The electrochemical cell of claim 26, wherein said cell square in transverse cross-section has each corner thereof chamfered, said square cells being arranged in configurations of four to form a channel internally of said configuration defining a channel through which a gas or liquid can flow in heat exchange relationship with said cells, said cells being electrically connected in series.

28. The electrochemical cell of claim 27, wherein a plurality of hexagonal cells are nested with electrical insulators separating the adjacent case, said cells being electrically connected in series.

29. An electrochemical cell comprising a porous sintered positive electrode having an electrochemically active layer of at least one transition metal chloride, a negative electrode of an alkali metal and a compatible electrolyte including an alkali metal salt molten at cell operating temperature, said electrolyte being present partially as a corrugated $\beta''$ alumina tube having a thickness less than 0.05 cm, said ratio of the volume of liquid electrolyte to the volume of the positive electrode being in the range of from about 0.1 to about 3.

30. The electrochemical cell of claim 29, wherein an ammonium salt pore former is present in the positive electrode prior to formation thereof in the range of from 5–30 wt %.

31. The electrochemical cell of claim 30, and further including bromide and/or iodide and sulfur containing additives in said positive electrode or said electrolyte, said bromide and/or iodide additives being present in an amount not greater than about 30% by weight based on the weight of said positive electrode and the sulfur additive being present in an amount not greater than about 10% by weight of said positive electrode.

32. The electrochemical cell of claim 31, wherein solid alkali metal chloride is present in the liquid electrolyte to provide additional utilization of said cathode material.

33. The electrochemical cell of claim 29, wherein liquid electrolyte is present between said corrugated $\beta''$ alumina tube and said positive electrode.

34. The electrochemical cell of claim 33, wherein a solid chloride salt of the negative electrode is present in the liquid electrolyte.

35. The electrochemical cell of claim 29, wherein the corrugated $\beta''$ alumina tube has a thickness in the range of from about 0.01 to about 0.05 cm and abuts α-alumina header in contact with said β" alumina tube.

36. The electrochemical cell of claim 35, wherein a porous support structure of $TiB_2$ or $ZrB_2$ is provided for the β" alumina tube.

37. The electrochemical cell of claim 35, wherein the cathode is $NiCl_2$, the anode is sodium, the electrolyte includes liquid $NaAlCl_4$ and solid NaCl is present in the liquid electrolyte.

38. The electrochemical cell of claim 36, and further comprising sealable means for positive electrode material to the cell.

39. The electrochemical cell of claim 38, and further comprising seal means for sealing the periphery of the anode, cathode and β" alumina electrolyte and to seal liquid electrolyte if present between the cathode and the β" alumina.

40. A plurality of stacked electrochemical cells each comprising a positive electrode, a negative electrode of an alkali metal molten at cell operating temperature, and a compatible electrolyte, said electrolyte being at least partially present as a corrugated β" alumina sheet having a thickness less than 0.05 cm separating said negative electrode and interior to said positive electrodes, said alkali metal being retained in a porous electrically conductive ceramic, and means for sealing the junctures of the electrolyte and the adjacent electrodes at the peripheries thereof.

41. The plurality of stacked electrochemical cells of claim 40, wherein said porous electrically conductive ceramic supports said β" alumina sheet, said β" alumina having a thickness less than about 0.05 cm.

42. The plurality of stacked electrochemical cells of claim 41, wherein said porous electrically conductive ceramics is $TiB_2$ or $ZrB_2$.

43. The plurality of stacked electrochemical cells of claim 41, wherein liquid electrolyte is present between the β" alumina electrolyte and the adjacent positive electrode.

44. The plurality of stacked electrochemical cells of claim 43, wherein solid chloride salt of the alkali metal anode is present in the liquid electrolyte.

45. An electrochemical cell comprising a positive electrode having an electrochemically active layer of at least one transition metal chloride, a negative electrode of an alkali metal and a compatible electrolyte including an alkali metal salt molten at cell operating temperature, said electrolyte being present at least partially as a corrugated β" alumina tube having a thickness less than 0.05 cm surrounding said negative electrode interior to said positive electrode and in contact with an α-alumina header, said electrochemical cell being capable of being constructed with positive electrodes having various diameters and geometries without altering the negative electrode and β" alumina tube.

* * * * *